April 7, 1953     L. S. GREENMUN     2,634,160
AUTOMOBILE WINDOW MOUNTING

Filed Dec. 12, 1947     2 SHEETS—SHEET 2

INVENTOR.
LEO S. GREENMUN
BY
William Soler
ATTORNEY.

Patented Apr. 7, 1953

2,634,160

UNITED STATES PATENT OFFICE 2,634,160

AUTOMOBILE WINDOW MOUNTING

Leo S. Greenmun, Avoca, N. Y.

Application December 12, 1947, Serial No. 791,319

4 Claims. (Cl. 296—44)

This invention relates generally to means for mounting windows in vehicles and the like, and more particularly to means for detachably mounting movable automobile windows so as to permit of their easy removal.

Automobile windows are subject to a variety of hazards which often cause the windows to break or shatter. With this in mind, it is desirable that the installation of a replacement window be a simple and inexpensive matter. In view of the strains to which movable windows are subjected, it is also desirable that the window mounting in a vehicle have a certain degree of flexibility or resiliency so as to permit the window to yieldably absorb the flexure engendered by lateral pressures and out of square conditions.

It is a primary object of my invention to provide automobile window mounting means which will hold the window securely, yet resiliently, in place.

Another object of my invention is to provide window mounting means which are readily accessible from the interior of a vehicle.

Still another object of my invention is to provide window mounting means of a character which will permit the window to be quickly and easily removed in the event it is damaged.

Other objects and advantages of my invention will become apparent during the course of the following description.

In the drawings, accompanying this specification, and forming a part thereof, and in which like numerals designate like parts throughout the same, Fig. 1 is an elevational view of the interior of an automobile door panel showing broadly a window regulating mechanism and the window mounting embodying the features of my invention.

Fig. 7 is an enlarged cross-sectional view taken on line 7—7 of Fig. 1, showing details of the channel structure, and Fig. 8 is an enlarged cross-sectional view taken on line 8—8 of Fig. 1, showing other details of the channel structure.

Figure 1:
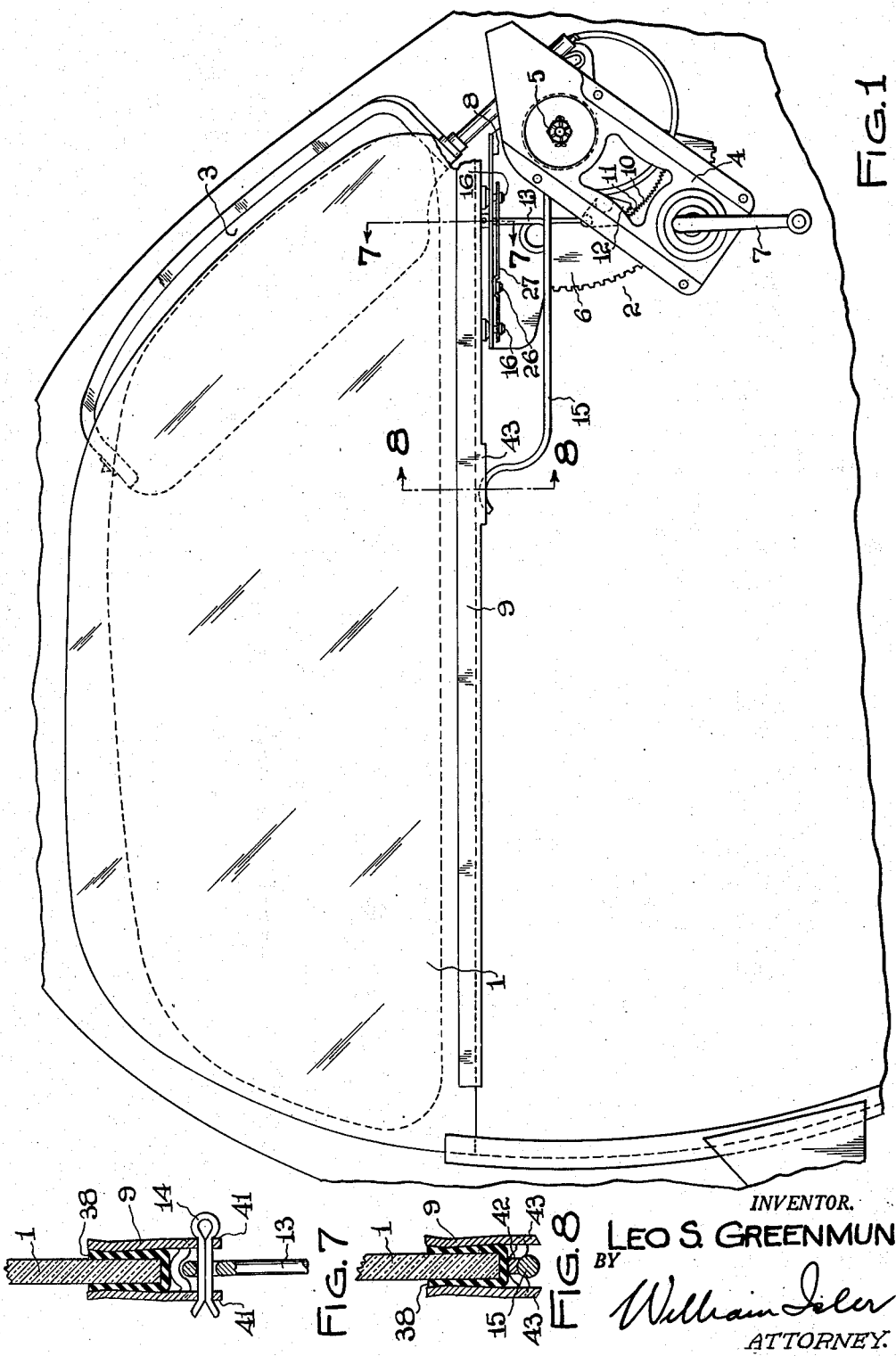

Referring now more particularly to the drawings, in Fig. 1 is shown the general arrangement of parts comprising a regulating mechanism for an automobile window 1. The regulator, designated generally by the numeral 2, is also effective to operate a wind deflector panel 3.

Briefly, the regulator 2 consists of a bracket 4 to which is pivotally secured as at 5 a gear sector 6 which is adapted to be rotated by a complementary gear (not shown) affixed to a crank handle 7, which is also mounted in the bracket 4.

The gear sector 6 has formed thereon a ledge or flange 8 to which is connected a reinforcing strip or window channel 9 in the manner to be hereinafter described.

The gear sector 6 has also formed thereon a series of serrations or teeth 10 which are concentric with the pivot 5 and which are adapted under certain conditions to cooperate and engage with similar teeth 11 formed on a pivotally mounted trigger 12. The trigger 12 is pivotally connected to a link 13 which, in turn, is hingedly secured to a pin 14 which extends transversely through the channel 9. The parts are so positioned, that normally the trigger 12 is not in engagement with the teeth 10 on the gear sector 6.

To facilitate movement of the window 1 to its various positions, a balance spring 15 is provided which bears at one end against the bracket 4 and bears against the channel 9 at its other end.

The arrangement and operation of the aforementioned parts are more fully disclosed and described in my copending application, Serial No. 622,032, now Patent No. 2,559,120, to which reference is made for an elaboration of the details.

My present invention concerns itself primarily with the mounting structure shown in Figs. 2 to 6 inclusive. To obtain the desirable mounting characteristics previously referred to, I have secured to the midportion of the channel 9, two knobs 16 which extend vertically through openings 17 provided therefor in the flange 8. The knobs 16 are circular in cross-section, but are, however, of irregular diameter, having a portion 18 which seats against the underside of the channel 9 and a centrally projecting shank 19 which extends upwardly through an opening 20 in the channel 9 and is adapted to be expanded to form a rivet head 21 thereby securing the knob 16 to the channel.

Immediately adjacent the portion 18 is a tapered section 22 which terminates in a circular bearing portion 23 which fits into the opening 17 of the flange 8. Depending centrally from the bearing portion 23 is a throat portion 24 of reduced diameter which flares outwardly to form a button 25.

Figure 2:
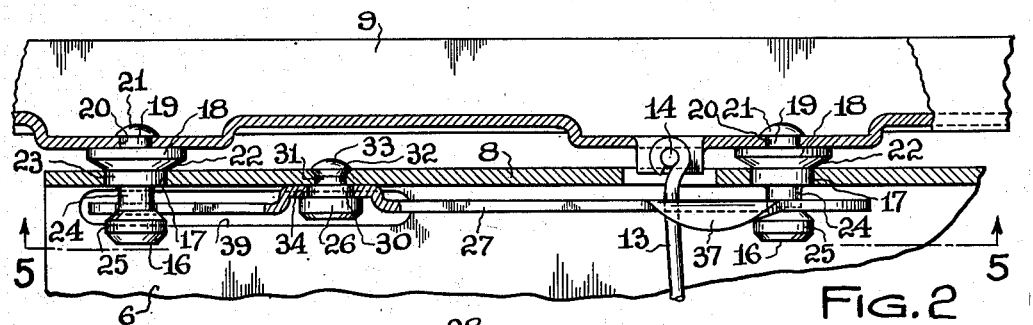
Fig. 2 is an enlarged fragmentary view showing details of the window mounting structure.

As best seen in Fig. 2, the knobs 16 are spaced longitudinally of the channel 9 and the flange 8. At a point on the underside of the flange 8 between the two knobs 16, but not necessarily midway between them, is pivotally secured, as by a fastener 26, a locking spring 27.

Figure 3:
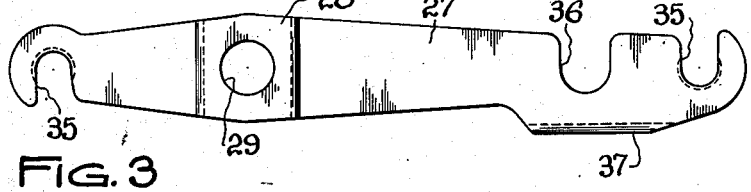
Fig. 3 is a plan view of the spring member which is an important feature of my invention.
Figure 4:
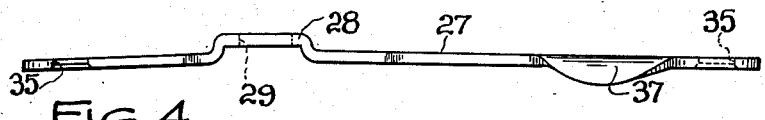
Fig. 4 is a view in elevation of the spring member.

As best seen in Figs. 3 and 4, the spring 27 is formed with an offset 28 provided with an opening 29 which accommodates a bearing portion 30 on the fastener 26. The fastener has a shank 31, of reduced diameter, which extends upwardly through an opening 32 in the flange 8 and which may be deformed to form a rivet head 33. The spring 27 is held slidably against the undersurface of the flange by a shoulder 34 on the fastener 26.

Figure 5:
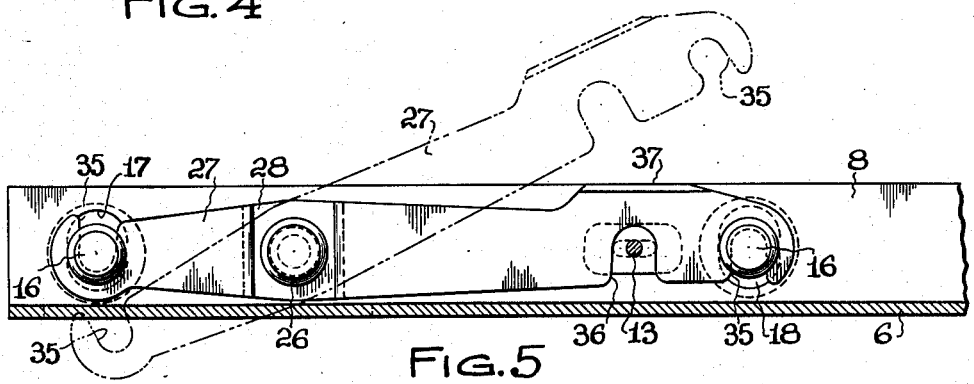
Fig. 5 is a sectional view taken on line 5—5 of Fig. 2.

Each end of the spring 27 is provided with an open-end slot 35, the open ends being on opposite sides of the spring, so that each slot 35 may engage the throat portion 24 of a knob 16 when the spring is rotated from the position shown in dotted lines in Fig. 5 to the solid line position. The buttons 25 on the knobs 16 serve to guide the spring 27 into position and also keep the spring under tension.

The spring 27 is also provided with a recess 36 which prevents interference between the spring and the link 13. A tab 37 is formed on one edge of the spring 27 for convenience in grasping the spring for the purpose of rotating it.

As seen in Figs. 1, 7 and 8, the lower edge of the window 1 is held within the channel 9, a cushion 38 of rubber, felt or similar material, being interposed between the glass and the channel to prevent chipping.

As the knobs 16 are also secured to the channel 9, it will be apparent that the action of the spring 27 against the knobs 16 will yieldably urge the tapered section 22 of each knob into abutment with the flange 8 and thereby maintain the window channel 9 in proximity thereto.

With the channel thus positioned, the window 1 will rotate to either an open or closed position in response to rotation of the gear sector 6. However, the window mounting is such that the window 1 is permitted a limited amount of lateral movement, equivalent to rotation about an axis defined by a line connecting the two knobs 16. Thus the window is capable of adjusting itself to compensate for conditions of misalignment and also is adapted to yieldably absorb lateral strains such as might occur when a person accidentally leans against the window.

The window mounting also permits a limited amount of rocking movement of the window relative to the flange 8. Thus an unauthorized attempt to force open the window by applying downward pressure to its upper edge, will cause the window to rock about a fulcrum formed by the knob 16 which appears to the left in Fig. 1. The forward portion of the window will be raised slightly thereby causing the link 13 to move upwardly and rotate the trigger 12 into a position where its teeth 11 mesh with the teeth 10 on the gear sector 6. The interengagement of the teeth 10 and 11 locks the gear sector against rotation thereby preventing further movement of the window. This locking action is more fully described in my copending application, Serial No. 622,032, to which reference has been previously made.

It will be noted that the spring 27 is pivotally secured to the flange 8 at a point that is closer to one of the knobs 16 than it is to the other. This off-center mounting of the spring causes the tension exerted on one of the knobs 16 to be greater than the tension on the other. Thus, in Figs. 1 and 2, I have shown the fastener 26 located closer to the knob 16, which appears to the left, so as to encourage the desired rocking movement, previously described, in the event of an attempt to force the window open.

By selecting a predetermined pivotal point for the spring 27, I can either increase or decrease the tension differential between the two knobs 16. Thus I employ only one spring to obtain different degrees of tension on each of the knobs 16.

As best seen in Fig. 5, the channel 9 is secured to the flange 8 by rotating the spring 27 to the position shown in solid lines. In the event it becomes necessary to remove the window for repair or replacement, the spring is rotated to the position shown in dotted lines, thereby releasing the window quickly and easily and without the use of tools. A slot 39 is provided in the gear sector 6 to prevent the gear sector from interfering with the rotation of the spring 27.

Figure 6:
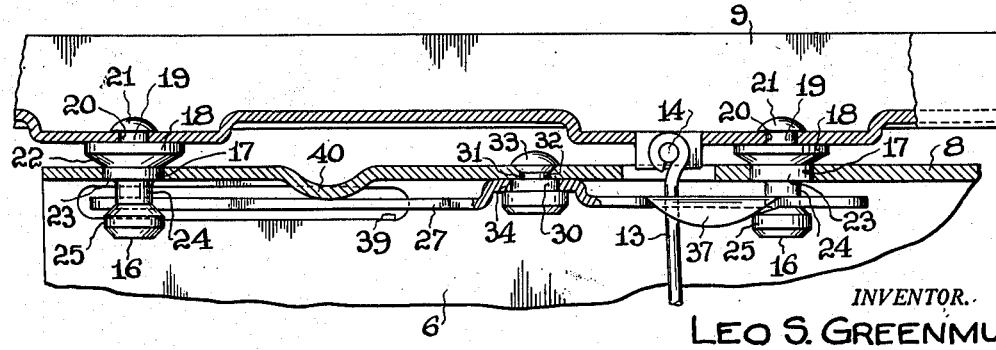
Fig. 6 is a view similar to Fig. 2 but showing a slight modification in the form of my invention.

In Fig. 6 I have shown a modified form of my invention, in which I provide a rib 40 on the flange 8 in order to permit a greater range of flexibility in adjusting the tension exerted by the spring 27 on each of the knobs 16. By shifting the position of fastener 26 to the right, I am able to increase the tension on the right-hand knob 16 while, at the same time, utilizing the stiffening effect of the rib 40 to maintain or increase the tension on the left-hand knob 16.

It will be understood that, although the position of the rib 40 and the fastener 26 are fixed in any specific installation, those positions may be so selected or predetermined as to produce the tension on each of the knobs 16 which is desirable under the particular circumstances.

Referring now to Fig. 7, I show means for securing the link 13 to the channel 9, which represent an improvement over the clips provided for this purpose in my copending application, Serial No. 622,032. In order to provide a support for the pin 14, I slit the midportion of the channel 9, longitudinally thereof, for a small portion of its length and bend the pieces, thus formed, outwardly so that they form elongated sides 41 of the channel 9. The sides 41 may then be pierced to provide openings for the pin 14, which extends transversely through the sides, and from which the link 13 is suspended.

In Fig. 8, I have shown means, similarly formed, for providing a track for the end of the balance spring 15, so as to prevent it from slipping out of the channel 9. In this instance, I slit the midportion of the channel 9 longitudinally thereof, forming two parallel spaced slits and leaving a central portion 42 intact. The slit portions are then bent outwardly to form elongated sides 43 on the channel. The spring 15 bears against the central portion 42 of the channel 9 and is prevented from slipping out of the channel by the sides 43.

It is to be understood that the forms of my invention herein shown and described represent preferred examples of the same, and that various changes in the shape, size and arrangement of the parts may be resorted to, without departing from the spirit of my invention or the scope of the subjoined claims.

Having thus described my invention, I claim:
1. Window mounting means for the movable window panels of automobiles and the like, comprising a channel member adapted to enclose one edge of said window, a movable support member disposed below said channel member, spaced elements depending from said channel member and projecting through said support member, and means pivotally secured to said support member intermediate said spaced elements and slidably engaging said projecting portions of said spaced elements to secure said elements against withdrawal from said support member, said spaced elements having their projecting portions provided with surfaces which converge toward said support and with which the pivotal member engages to place said member under tension.

2. Window mounting means for the movable window panels of automobiles and the like, comprising a channel member adapted to enclose one edge of said window, a movable support member disposed below said channel member, spaced projections depending from said channel member and having free ends extending through said support member, said free ends terminating in enlarged heads connected to the projections by conical surfaces converging toward the said support and a single tension member secured to said support member intermediate said spaced projections and slidably engaging the conical surfaces of the free ends of each of said projections whereby to resiliently maintain said channel member in proximity to said support member.

3. Window mounting means for the movable window panels of automobiles and the like, comprising a reinforcing strip secured to the lower edge of said window panel, a movable support member underlying said reinforcing strip, spaced elements secured to said reinforcing strip and having portions projecting through said support member, a tension producing element movably secured to said support member and slidably engaging the projecting portions of said spaced elements, and a fulcrum provided on said supporting member and abutting a portion of said tension producing element for increasing the tension exerted by said tension-producing element on one of said spaced elements.

4. Window mounting means for the movable window panels of automobiles and the like, comprising a reinforcing strip secured to the lower edge of said window panel, a movable support member underlying said reinforcing strip, spaced elements secured to said reinforcing strip and having portions projecting through said support member, and a flat spring pivotally secured to said support member intermediate said spaced elements, but closer to one of the elements than to the other, and movable into locking engagement with the projecting portions of said elements whereby to resiliently maintain said elements against withdrawal from said support member, the tension exerted by said spring on one of said elements being greater than that exerted on the other.

LEO S. GREENMUN.

REFERENCES CITED

The following references are of record in the file of this patent:

UNITED STATES PATENTS

| Number | Name | Date |
| --- | --- | --- |
| 89,659 | Hazelton et al. | May 4, 1869 |
| 343,066 | Ready | June 1, 1886 |
| 504,296 | Beam | Aug. 29, 1893 |
| 537,639 | Helton | Apr. 16, 1895 |
| 729,763 | Hartmann | June 2, 1903 |
| 869,040 | Albright | Oct. 22, 1907 |
| 1,039,599 | Shank | Sept. 24, 1912 |
| 1,713,088 | Nicholson | May 14, 1929 |
| 1,951,419 | Jacobi | Mar. 20, 1934 |
| 1,954,268 | Simpson | Apr. 10, 1934 |
| 2,077,454 | Almdale | Apr. 20, 1937 |
| 2,303,170 | Morrison | Nov. 24, 1942 |
| 2,409,068 | Roethel | Oct. 8, 1946 |
| 2,447,990 | Roethel | Aug. 24, 1948 |
| 2,449,000 | Merrill | Sept. 7, 1948 |
| 2,449,210 | Faust | Sept. 14, 1948 |
| 2,479,833 | Greenmun | Aug. 23, 1949 |

FOREIGN PATENTS

| Number | Country | Date |
| --- | --- | --- |
| 775,260 | France | Oct. 8, 1934 |